US005840143A

United States Patent [19]

Swanson

[11] Patent Number: 5,840,143

[45] **Date of Patent: *Nov. 24, 1998**

[54] METHOD OF MAKING AN IDENTIFICATION CARD

[75] Inventor: Roger W. Swanson, Barrington, Ill.

[73] Assignee: Champion Business Forms, Inc., Glendale Hts., Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 646,700

[22] Filed: May 3, 1996

[51] Int. Cl.[6] ............................ B32B 31/00; B42D 15/10

[52] U.S. Cl. .......................... 156/256; 156/226; 156/227; 156/248; 156/253; 156/257; 156/268; 156/289; 283/101; 283/105

[58] Field of Search .................................... 156/217, 268, 156/248, 227, 289, 270, 253, 257, 299, 226, 247, 256, 277, 267; 283/101, 105

[56] References Cited

U.S. PATENT DOCUMENTS

| | | | |
|---|---|---|---|
| 3,486,257 | 12/1969 | Walldorf | 40/299 |
| 4,951,970 | 8/1990 | Burt | 283/67 |
| 4,986,868 | 1/1991 | Schmidt | 156/249 |
| 5,011,559 | 4/1991 | Felix | 156/257 |
| 5,083,979 | 1/1992 | Burt | 462/3 |
| 5,098,759 | 3/1992 | Felix | 428/42 |
| 5,238,720 | 8/1993 | Volkman | 428/40 |
| 5,283,093 | 2/1994 | All | 428/41 |
| 5,318,326 | 6/1994 | Garrison | 283/101 |
| 5,427,416 | 6/1995 | Birch | 283/109 |
| 5,466,013 | 11/1995 | Garrison | 283/107 |

*Primary Examiner*—David A. Simmons
*Assistant Examiner*—Linda L. Gray

[57] ABSTRACT

A method of making an identification card by advancing a continuous web having a first side and a second side along a predetermined path and coating a first portion of the first side with a release agent. The first portion and a second portion of the first side are then coated with a pressure sensitive adhesive, the second portion being adjacent to the first portion and about the same size as the first portion. Next, a sheet of clear plastic is adhered to the adhesive so that the plastic overlays the first and second portions. The plastic sheet and the web are then perforated or die cut around the outer periphery of the first and second portions. The web is also perforated or die cut between the first and second portions. Next, only the first portion of the web is then removed from the plastic sheet and the second portion of the web to expose one-half of the plastic sheet and the adhesive thereon while maintaining the entire second portion with the plastic sheet. The exposed half of the plastic sheet is then folded over the second portion and adhered to the second side of the second portion.

14 Claims, 4 Drawing Sheets

METHOD OF MAKING AN IDENTIFICATION CARD

BACKGROUND OF THE INVENTION

This invention describes a method of making an identification card. The card has a printable substrate and is ultimately covered on both sides by clear plastic. More specifically, the method provides an efficient way of making a plastic coated card that can be printed during its initial manufacture and personalized prior to folding over the coating of the second side. In one embodiment, the card substrate can be a paper web that can also carry other instructions or decoration.

The use of paper cards (for example I.D. cards for proof of auto insurance) is growing rapidly. Paper cards are less expensive to buy and personalize than plastic cards. This invention provides the longevity of a plastic card with a cost between uncoated paper and plastic.

Others have attempted to make an identification card. For example, U.S. Pat. No. 4,986,868 shows a method of making a card having multiple layers. A separate additional release liner layer is required to be removed prior to the folding operation in order to make the card.

As shown in U.S. Pat. No. 5,011,559, it is known to make a sheet of paper containing an integral separable self-adhesive label.

U.S. Pat. No. 5,427,416 shows another attempt to make a clear plastic coated identification card on a paper web carrier by creating a window in the carrier adjacent the portion of the web in which the card will be created. The window either has exposed adhesive on the side of the clear plastic laminate, or a separate removable backing sheet is needed to cover the adhesive. The backing sheet must be removed in order to finalize or personalize the card.

SUMMARY OF THE INVENTION

The invention provides a method of making an identification card comprising the steps of advancing a continuous web having a first side and a second side along a predetermined path, and coating a first portion of the first side with a release agent. The first portion and a second portion of the first side are coated with a pressure sensitive adhesive, the second portion being adjacent to the first portion and about the same size as the first portion. Next, a sheet of clear plastic is adhered to the adhesive so that the plastic overlays the first and second portions. The plastic sheet and the web are then perforated or die cut around the periphery of the first and second portions. The web is also perforated or die cut between the first and second portions. The first portion of the web is then removed from the plastic sheet and the second portion of the web to expose one-half of the plastic sheet and the adhesive thereon. The exposed half of the plastic sheet is then folded over the second portion and adhered to the second side of the second portion.

The web can be made of paper and at least the first side of the paper may be coated with a coating that resists penetration of the release agent. The coating may be a barrier coating and may preferably be placed only on the first portion of the first side.

Either the first side or the second side can be printed with instructional, decorational or advertising material prior to the introduction of the barrier coating, if any, or adhesive coating or release agent.

Since most identification cards are rectangular, the first and second portions are preferably generally rectangular in shape. Moreover, the first and second portions may only comprise a fraction of the total area of a page formed by a third perforation or die cut crossing the width of the web. The remainder of the page may also be printed or have further instructions.

The invention also entails a method of preparing a series of instruction sheets and identification cards comprising advancing a continuous paper web having a first side and a second side and printing the web with instructions on one or both of the first and second sides. A first generally rectangular portion of the first side is coated with a release agent and that first portion and a second portion of the first side are coated with a pressure sensitive adhesive. The second portion is also generally rectangular and adjacent to the first portion and about the same size as the first portion. Next, a sheet of clear plastic is adhered to the adhesive so that the plastic overlays the first and second portions. The plastic sheet and web are perforated or die cut near the periphery of the first and second portions. Then the web is perforated or die cut across its width at a location not through the first and second portions to create a series of third portions with each third portion layer than the total area of the first and second portions and containing the first and second portions. The composite made by this method can then be sent to the user of the cards after folding the web along the perforation or die cut forming the third portions accordion style, or stacking the third portions as separate sheets.

The user can then sign the cards or fill in further data on the second portion, or the part of the third portion not containing the first and second portions. The user can then remove the first and second web portions together with the adhered plastic sheet from the remainder of the third portion.

The first web portion can then be removed from the second portion and adhered plastic sheet, and the plastic sheet is folded over the second side of the second portion to create a clear plastic coated card.

Again, one or both sides of the web, in any of the first, second or third portions can be printed with instruction material.

One object of the invention is to provide protection, in the form of clear plastic covering both sides, for the portion of a form that could be punched out by the end user to make up a membership card, a photo card, a bar code, a magnetic stripe, a signature or a temporary card.

A further object of the invention is to provide a method of making a card from a form that is inexpensive but is protected by a clear plastic coating on both sides.

It is a further object of the invention that the card can be initially formed in a portion of a larger form. Both the card and the remainder of the form can be initially printed with instructional material for the end user. Once received, the end user can read the information printed on the form, personalize the card with a signature, a number, a bar code or the like and remove the card from the form. While removing the card from the form, the end user folds a previously adhesive coated sheet of clear plastic over an open side of the substrate to create a fully protected card.

The specification details a description of the invention are for purpose of illustration. Many variations in the details herein given may be made by those skilled in the art without departing from the spirit and scope of the invention.

DESCRIPTION OF THE PREFERRED EMBODIMENT

As described in the Figures, the new and novel method of making identification cards starts with a continuous substrate or web 10 capable of accepting ink and other liquid or semi-liquid coatings. In a preferred embodiment, the web is paper and has a surface finish or Sheffield of 10 to 21 and a thickness or caliper of 0.004 to 0.009 inches. The web initially is continuously wound on a roll 12 as in FIG. 5.

Figures 4A, 4B, 4C:
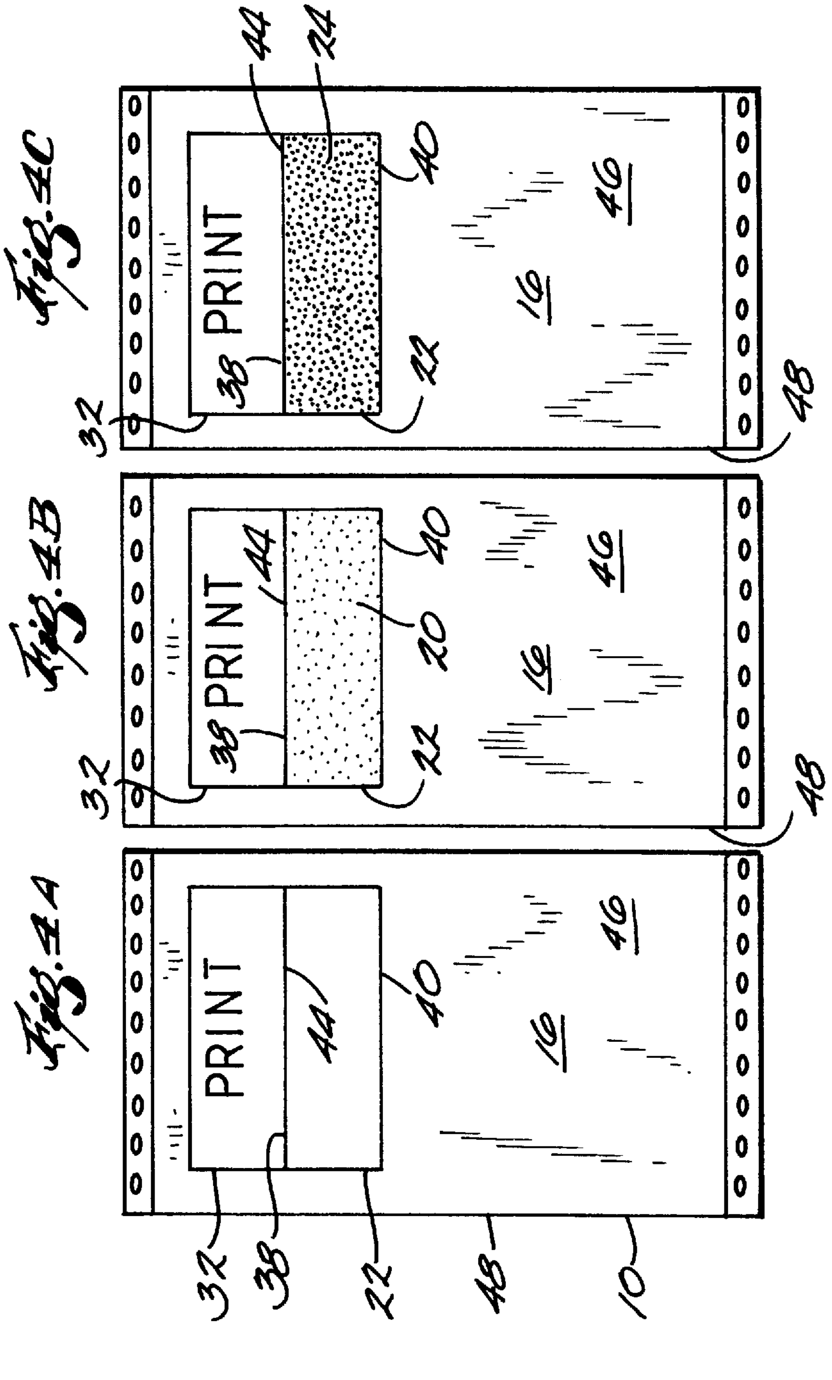
FIGS. 4A through 4C are top views of side one of the web in three stages of the process.
Figure 5:
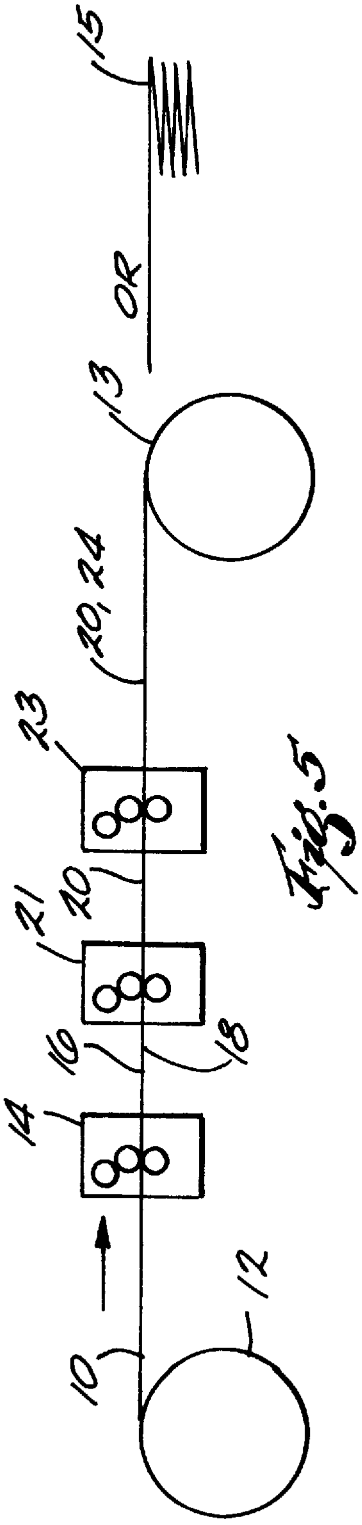
FIG. 5 is a schematic view of the web as it advances in early stages of one embodiment of the method.

As also seen in FIGS. 4A and 5, in a preferred embodiment the web is unwound from roll 12 and initially passes through a printing press 14 which prints instructional, decorational or advertising material on either a first top side 16 of the web 10, or a second bottom side 18 of the web 10, or both sides.

Next, in one embodiment, an optional varnish or barrier coat 20 can be applied by a coating machine 21 to a selected first area or portion 22 of the first side 16 of the web 10. (FIGS. 4B & 5) The varnish coat is needed on webs having so much porosity that the silicone release coat 24 or possibly even the adhesive coat 28, both to be described later, will not remain on the surface of the web for a sufficient length of time to allow the web to be shipped and subsequently manipulated by the end user to make a card. In a preferred embodiment, the varnish of the varnish coat is clear. If used, the varnish coat may also be applied to a second area or portion 32 of the first side 16 of the web 10, adjacent the first area 22. The varnish must then be allowed to dry.

As seen in FIGS. 4 & 5, in the next step a silicone or release coat 24 is applied to the first area 22 of the first side 16 of the web 10 by coating machine 23. The release coat 24 is preferably clear and has a peel strength similar to that of a release liner of silicone paper.

Figure 6:
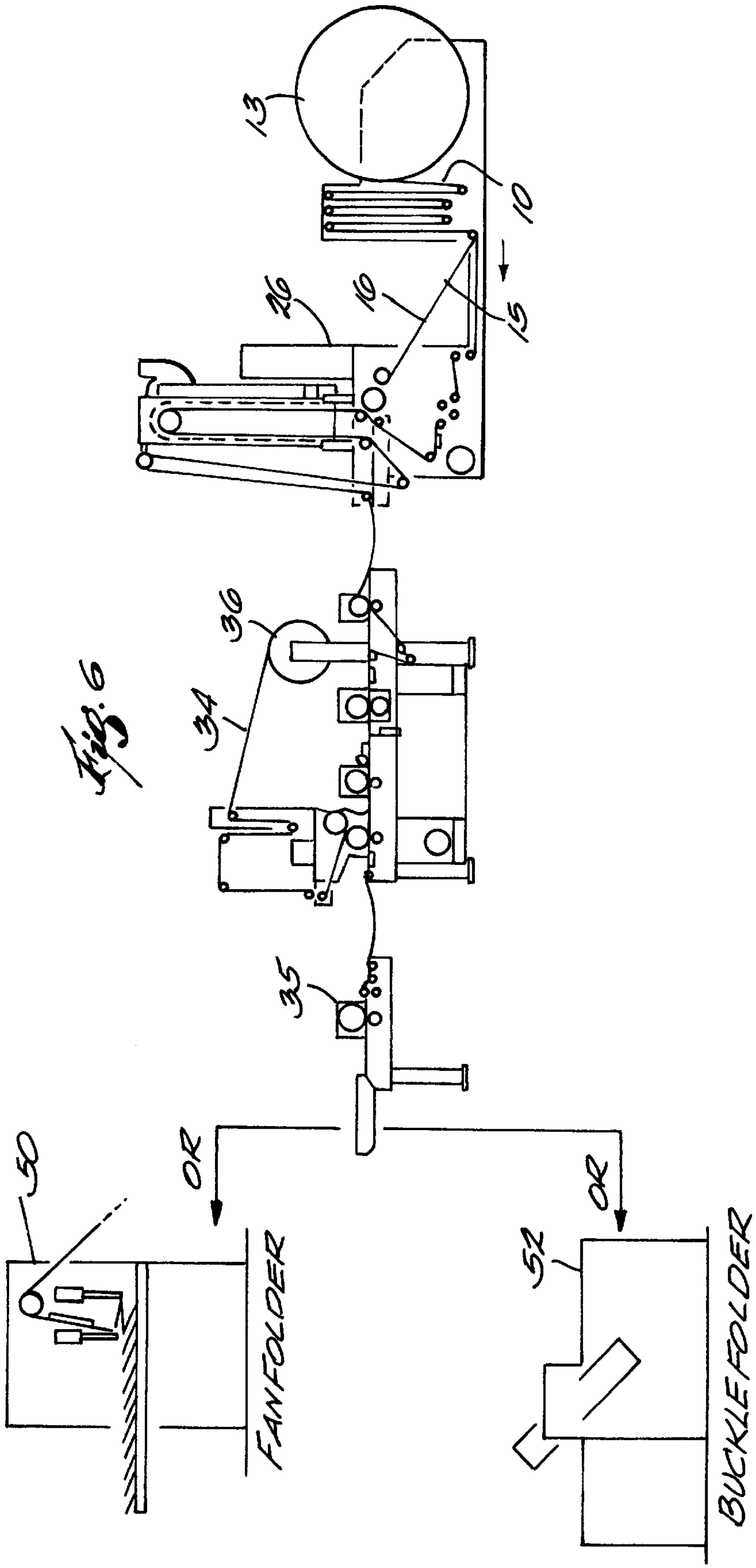
FIG. 6 is a partially schematic side view of one apparatus for carrying out the method.

In one embodiment, not shown, the web may immediately pass to the next step. In the preferred embodiment, as shown in FIGS. 5 & 6, the printed web may be rewound into a roll 13 for later processing. Optionally, the web 10 may be printed and folded into a fan folded pack 15 for later processing, After the above initial processing, the roll 13 is unwound and a pressure sensitive adhesive layer 28 is applied to the first area 22 of the first side 16 and the second area 32 of the first side 16 of the web 10. The second area 32 lies beside the first area and is of the same general size and shape of the first area. If the first area is generally rectangular or square, the second area 32 shares a straight side 38 with the first area 22. The adhesive layer 28 can be applied and dried in an applicator press such as shown at 26 in FIG. 6. Accordingly, the adhesive layer overlays the release layer, which was previously applied to the first area 22, and the second area 32 of the web, both of which areas 22 and 32 may also have a varnish coat which would also be overlaid.

A clear plastic sheet, or layer 34, is then unwound from a roll 36 and applied on the first side 16 of web 10. Preferably, the sheet 34 has a thickness of approximately 0.002 to 0.005 inches. The plastic sheet is cut to size to overlay the first area 22 and the second area 32, and accordingly the adhesive layer 28. In addition, in one embodiment, the plastic sheet may extend for a short distance outwardly around the periphery of the first area 22 and second area 32 to ensure that the adhesive layer 28 is fully covered thereby. It can be appreciated, by this construction, the plastic sheet or layer 34 is adhered to the second area 32 and releasably adhered to the first area 22.

Once the plastic layer 34 is mated or adhered to the first side 16 of the web 10, selected perforations, die cuts or weakened areas, can be made in the web 10 and the plastic sheet 34, in perforator 35. A first perforation or die cut 40 is made in both the plastic sheet 34 and the web 10 near the periphery of the combined first 22 and second 32 areas. Secondly, a second perforation or die cut 44 is created preferably only in the web in the straight side 38 shared by the first and second areas. Optionally, the second perforation 44 can also extend through the plastic sheet 34.

If the web 10 is initially a continuous form unwound from a roll, the web can be perforated by a third perforation 48 along a line extending across the width of the web to cut the web into a series of individual forms or third areas 46 that incorporate the first 22 and second 32 areas, but in a preferred embodiment, are larger than the first and second areas.

As seen in FIG. 6, the web and adhered plastic sheet can then either be fan folded in a fan folder 50 or buckle folded in a buckel folder 52. In another embodiment, the third areas may be separated and stacked as individual sheets. In any form these can then be shipped to an end user.

In use by the end user, the web 10 and adhered plastic sheet 34 is either unfolded or unstacked to expose one third area 46. Instructions or advertising material which were printed on either the first side, 16 or the second side 18 can then be read by the user. Moreover, a signature, number, label having a bar code or other identification can be written, adhered or typed on the web anywhere that is not covered by the plastic sheet. In a preferred embodiment, the second side 18 of the second area 32 can be signed by the end user.

After signature or other operation by the end user, if any, the first 22 and second 32 areas and the plastic sheet can be removed from the remainder of the third sheet or area 46 by breaking the first perforation near the periphery of the first 22 and second 32 portions. The web of the first portion 22 can then be removed from the combination of plastic sheet 34 and first 22 and second 32 web portion by peeling it off the same. It can be appreciated that the release coating 24 previously applied to the first area allows the web 10 of the first area to be removed from the plastic sheet 34, and adhesive layer 28, with the adhesive layer 28 staying with the plastic 34.

Figure 1:
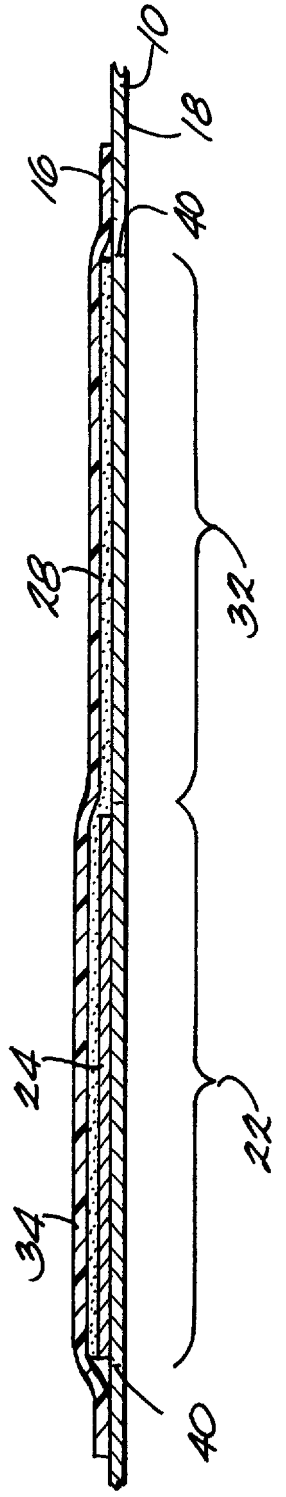
FIG. 1 is a partial exploded cross sectional view of an embodiment of the invention.
Figure 2:
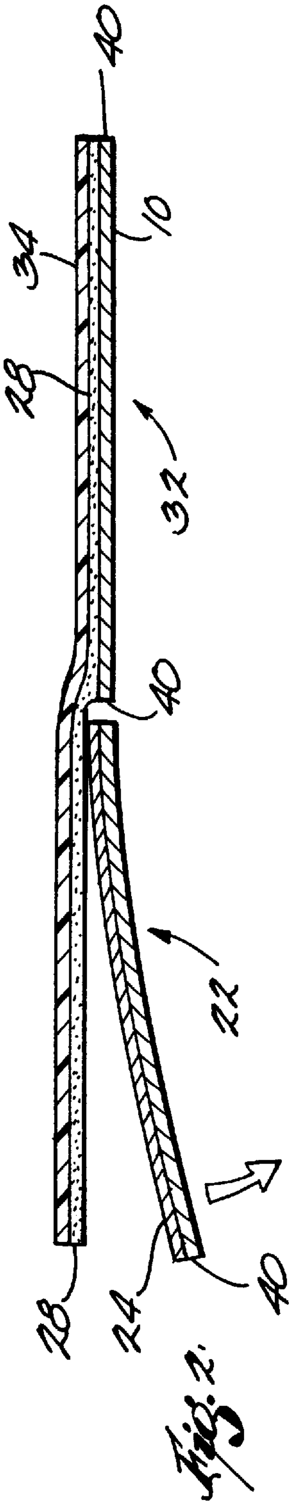
FIG. 2 is a partial exploded cross sectional view of an embodiment of the invention at a later stage in the method.
Figure 3:
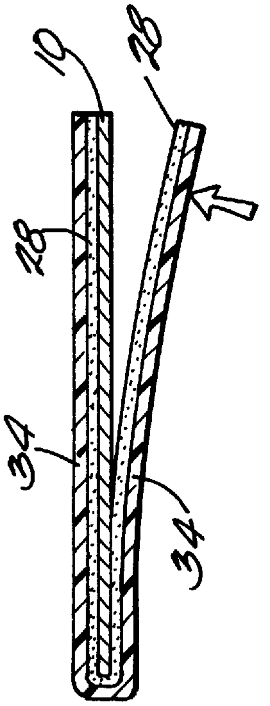
FIG. 3 is a partial exploded cross sectional view of an embodiment of the invention at an even later stage in the method.

As seen in FIGS. 2 & 3, the web first portion can then be discarded or recycled. The plastic sheet and adhesive layer that formerly overlaid the web first portion is then folded over the second portion 32 so that the plastic overlays the second side 18 of the second portion 32 as well as the first side 16 of the second portion 32 which was previously covered.

By this method, an identification card that can be signed by the end user on the second side, is made efficiently and inexpensively, and the card ultimately ends up being plastic coated on both sides to allow it to be durable.

In a preferred embodiment, the third area 46 is larger than the combined first 22 and second portion 32 in order to have area for instructional material. However, it should be appreciated that if instructional material is not required, the first and second portions could take up substantially the entire web.

While a preferred embodiment of the invention has been described using specific terms, such description is for illustrative purposes only, and it is to be understood that changes and variations may be made without departing from the spirit or scope of the following claims.

I claim:

1. A method of making an identification card comprising the steps of, a) Advancing a continuous web having a first portion and a second portion with each said portion having a first side and a second side, the sum of the areas of the first portion and the second portion being less than the area of the web, and the combined first and second portions having an outer periphery, b) Coating only said first portion of said first side with a release agent, c) Coating said first side of said first portion and said first side of said second portion with a pressure sensitive adhesive, said second portion being adjacent said first portion and about the same size as said first portion, d) Adhering a sheet of clear plastic to said adhesive so that said plastic overlays said first and second portions, e) Perforating or die cutting said plastic sheet and said web with a single cut near the periphery of said first and second portions around the entire perimeter thereof, f) Perforating or die cutting said web between said first and second portions, g) Removing said first and second portions of said web and said overlying clear plastic sheet along said single cut from the remainder of said web, h) Removing only said first portion of said web from said plastic sheet and from said second portion of said web along said cut or said perforations between said first and second portions while maintaining the entire said second portion with said plastic sheet to expose one half of said plastic sheet and said adhesive thereon, and I) Folding said exposed half of said plastic sheet over said second portion and adhering said exposed half of said plastic sheet to said second side of said second portion to form an identification card.

2. The method of claim 1 wherein said web is paper and further comprising the step of printing at least one of said second sides of said paper.

3. The method of claim 1 wherein said web is paper and further comprising the step of coating said first side of said first portion with a barrier coating prior to coating said first portion of said first side with said release agent.

4. The method of claim 1 further comprising the step of printing said first side of said first portion prior to coating said first side of said first portion with said release agent.

5. The method of claim 4 wherein said first and second portions are generally rectangular in shape.

6. The method of claim 5 wherein said web has a width and wherein said web is further perforated along the width to form a third portion, said third portion being larger than the sum of said first and second portions, and containing said first and second portions.

7. The method of claim 1 wherein said plastic sheet is also perforated between said first and second portion.

8. A method of preparing a series of instructional sheets, where each said instructional sheet contains an identification card, comprising, a) Advancing a continuous paper web having a first generally rectangular portion and a second generally rectangular portion, with each said portion having a first side and a second side, b) Coating only said first side of said first portion with a release agent, c) Coating said first side of said first portion and said first side of said second portion with a pressure sensitive adhesive, said second portion also being adjacent said first portion and about the same size as said first portion, and sharing a common side with said first portion, d) Adhering a layer of clear plastic to said adhesive so that said plastic overlays said first and second portions, e) Creating a first die cut or first perforation in said layer of plastic and said web by a single cut around the periphery of the entire perimeter of said first and second portions where the single cut is within the perimeter, f) Creating a second perforation in said web along said shared common side where the second portion of the web contains only one cut which is the first cut or the first perforation, and, g) Creating a plurality of third perforations in said web across said width, outside of said first and second portions to create a series of third portions, each said third portion containing one said card and each said third portion being larger than the sum of the areas of said first portion and said second portion.

9. The method of claim 8 further comprising the step of folding said web along said third perforations accordion style.

10. The method of claim 9 further comprising the step of unfolding said web and, for each third portion, removing said first and second portions and said layer of clear plastic from the remainder of said third portion along said first die cut or said first perforation.

11. The method of claim 10 also comprising the step of removing only said first portion from said second portion, said adhesive coating and said layer of clear plastic while maintaining the entire said second portion with said layer of clear plastic, and folding said layer of clear plastic over said second side of said second portion.

12. The method of claim 11 also comprising the step of printing both sides of said web with instructional material.

13. The method of claim 8 further comprising the step of cutting said web along said third perforations and stacking said third portions.

14. The method of claim 8 wherein, for each said third portion, said layer of clear plastic is larger than said total area of said first and second portions, but smaller than said third portion.

* * * * *